L. O. MAKEPEACE.

Assignor by mesne assignments to J. S. Perkins.

BOOT AND SHOE CRIMPING MACHINE.

No. 7,686.

Reissued May 15, 1877.

Witnesses:

Will H. Dodge

Donn J. Purtchill

Inventor:

L. O. Makepeace by Dodger & Son

Attys.

N. PETERS, PHOTO-LITHOGRAPHER, WASHINGTON, D. C.

UNITED STATES PATENT OFFICE.

LYSANDER O. MAKEPEACE, OF WORCESTER, MASSACHUSETTS, ASSIGNOR, BY MESNE ASSIGNMENTS, TO JOHN S. PERKINS, OF SAME PLACE.

IMPROVEMENT IN BOOT AND SHOE CRIMPING MACHINES.

Specification forming part of Letters Patent No. 131,288, dated September 10, 1872; reissue No. 7,686, dated May 15, 1877; application filed April 30, 1877.

*To all whom it may concern:*

Be it known that I, LYSANDER O. MAKEPEACE, of Worcester, in the county of Worcester and State of Massachusetts, have invented certain new and useful Improvements in Boot and Shoe Crimping Machines; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

This invention relates to that class of crimping-machines in which the leather or vamp is crimped by pressing it between two jaws by a follower; and the invention consists in so constructing and arranging the jaws and their clamping devices that the point of clamping may be thrown to one side of the center, as hereinafter more fully set forth.

Figure 1:
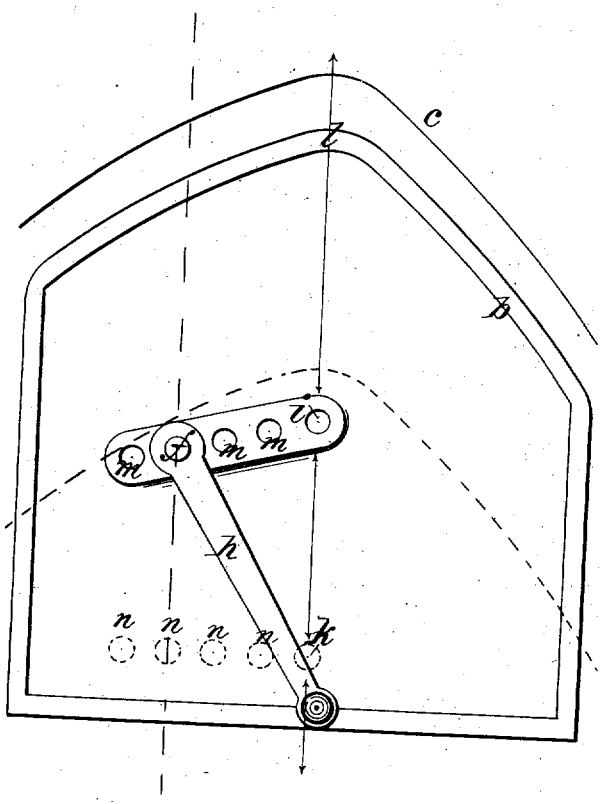
Figure 2:
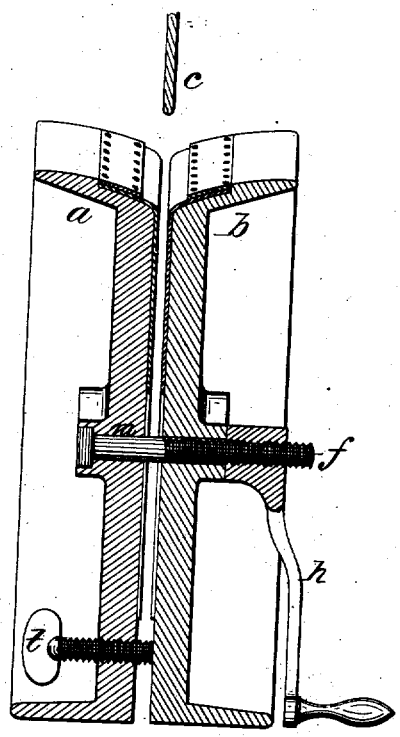

Figure 1 is a side elevation, and Fig. 2 is a transverse vertical section on the line *x x* of Fig. 1.

The jaws *a* and *b* are constructed in the usual manner, as is also the follower *c*, the jaws being clamped together by a bolt, *f*, which has a nut with a handle, *h*, for tightening or adjusting them, as may be required. There is also the usual adjusting-screw *t* at the bottom, by means of which the jaws are held or forced apart at their lower edges, so as to throw their upper edges inward, and cause them to impinge and press upon the leather as it is crowded down between them by the follower *c*, these all being common and well-known features in this class of machines.

As hitherto constructed, the jaws of these machines have had the hole for the clamping-bolt *f* made directly below the central apex of the jaws, in line with the angle of the follower *c*, which angle is at the instep of the boot, as illustrated in Fig. 1, where *i* indicates the bolt-hole as usually located, it being, as there shown, on a vertical line directly underneath the point or apex *l* of the jaws and directly under the angle of the follower *c*, the position of which is there indicated by a dotted line, the hole for the temper-bolt being located below on the same vertical line as shown at *k*. This construction or arrangement of parts works satisfactorily when ordinary boots are to be crimped, because in such case the relative length of the leg and foot are such that when forced by the follower in between the jaws the pressure on each side of the clamping-bolt *f* is so nearly balanced or equal that the leather is drawn with uniform force, or nearly so, along its whole extent on the follower; but with a boot or shoe in which the foot portion of the vamp or upper is considerably longer than the leg portion it does not work well, for the reason that so much more of the leather is crowded between the jaws on one side of the clamping-bolt than on the other side that the equilibrium of pressure is destroyed, the pressure on the foot side of the jaws (which, in this case, is the left-hand side of Fig. 1) being spread over, or expended upon, a much larger surface of the leather than on the opposite (or right-hand) side. The result of this is that the leather is unequally drawn and pressed upon the follower, it not unfrequently being torn by the excessive pressure on one side, while on the other it is insufficiently pressed and drawn, and hence results in imperfect crimping.

Now, the object of my invention is to obviate this difficulty and to produce a crimping-machine by means of which any and all sizes and styles of boots and shoes can be properly and successfully crimped.

To accomplish this result I provide the jaws *a* and *b* with a series of holes, *m*, or a slot, by means of which the clamping-bolt *f* may be located or moved to one side of the center, as represented in Fig. 1, it being understood that it is to be located or moved nearer to the toe of the vamp—that is, to one side of the central line—where it is usually located, whereby the pressure on the leather at each side of the clamping-bolt may be equalized, so as to peform the crimping in a proper manner, the adjusting-screw *t* being moved correspondingly, for which purpose a series of holes, *n*, are made in the jaw *a*, as represented in Fig. 1.

The distance that the clamping-bolt is to be moved will, of course, depend upon the style of boot or shoe to be crimped. Just in proportion as the leg portion of the vamp is shortened in relation to the length of the foot, just in that proportion will the clamping-bolt be moved toward the toe side of the jaws. For boots having a short leg it will require to be located a little to the toe side, while for one having a still shorter leg it will be moved still farther toward the toe. So with the various styles of what are known as "walking" or "high" shoes, which have a portion of the vamp formed of the same piece as the upper or front part of the foot, and so cut as to extend up in front of the ankle above the instep. They, too, are crimped the same as a boot; and in crimping them the clamping-bolt should be located nearer to or farther from the central point, according as the leg portion of the vamp is longer or shorter.

It is obvious that where a single style of boot or shoe is to be crimped, all that will be necessary will be to make a single hole for the clamping-bolt, care being taken to locate it far enough to one side to adapt the machine to that particular style, as in such cases no further adjustment will be required; and it is also obvious that with the clamping-point once adjusted or located for any particular style or form of boot or shoe it will answer for crimping others of a similar style or form, though varying somewhat in the relative lengths of foot and leg, though, to produce the most perfect results, it should be adjusted for each particular style or form, if there be a difference in the relative lengths of foot and leg.

But, as manufacturers often, if not generally, make different styles of boots or shoes, or both, in the same factory, I prefer to make the machine with a series of holes or with a slot, so that the clamping-point can be adjusted to suit all the various sizes and kinds of both boots and shoes, thereby adapting the machine to the varying wants of all, and thus avoid the necessity of having a different machine for different styles of work.

The advantages of a machine constructed on this plan will be readily understood, for not only does it enable the manufacturer to adapt it to the crimping of all sizes and styles of vamps with equal success, but it also enables him to throw the pressure more or less on the foot portion of the vamp, which is highly important, as it is the foot portion that mainly requires to be pressed into form or shape, the leg being changed but slightly in the crimping process.

Having thus described my invention, what I claim is—

1. A pair of jaws for crimping the uppers of boots and shoes, adapted to have the bolt or clamping device located or thrown more or less on the toe side of the instep angle of the follower or apex of the jaws, substantially as and for the purpose set forth.

2. The jaws *a* and *b*, provided with one or more holes, *m*, located on the toe side of a vertical line, *l*, dropped from the instep angle of the follower *c*, substantially as described, and for the purpose set forth.

3. A pair of crimping-jaws, having their clamping bolt or device made adjustable laterally, substantially as shown and described.

4. In combination with the pair of jaws, having their clamping-bolt made adjustable laterally, the laterally-adjustable set-screw *t*, substantially as described.

LYSANDER O. MAKEPEACE.

Witnesses:

IRVING S. TOGG,

CHARLES BODWELL.